United States Patent Office

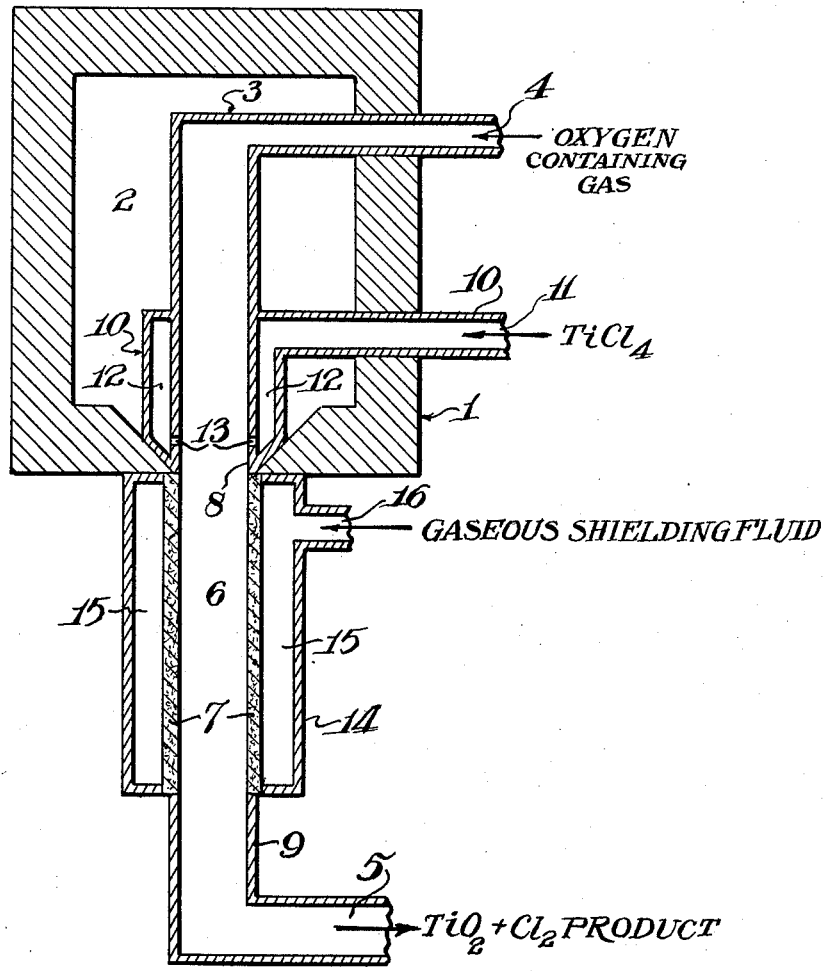

2,915,367
Patented Dec. 1, 1959

2,915,367

METAL OXIDE PRODUCTION

Carl Marcus Olson, Kennett Square, Pa., and John Nelson Tully, New Providence, N.J., assignors to E. I. du Pont de Nemours and Company, Wilmington, Del., a corporation of Delaware Application April 27, 1956, Serial No. 581,240

5 Claims. (Cl. 23—202)

This invention relates to the production of metal oxides through the vapor phase oxidation of their halides, and more particularly to the preparation of pigmentary, finely-divided titanium oxide by reaction of an oxygen-containing gas with vaporous titanium tetrachloride.

This application is a continuation-in-part of our co-pending application, Serial No. 411,207, filed February 18, 1954, now abandoned.

It is known that metal oxides may be produced by the oxidation of vaporized metal halides. In such processes a volatilized metal halide, such as a chloride of iron, titanium, aluminum, etc., is reacted at elevated temperatures with oxygen, air, or like suitable oxygen-containing gas to form the respective oxide of the metal and chlorine.

In such prior processes, a portion of the oxide product formed deposits upon and tenaciously adheres to the internal surfaces of the reactor, instead of being swept out of such reactor by the gas stream. This is very objectionable for several reasons. Among other reasons, a portion of the product is thereby lost, since it frequently cannot be recovered in useful form. Again, if the oxide forms in a desirable state, the different conditions prevailing at the surface of the reactor over those existing within the reaction space cause an undesired particle size growth and crystallinity change which renders the product unfit for an intended or pigmentary use. Even where loss of material can be tolerated, segments thereof frequently dislodge from the reactor walls and contaminate the desirable products being recovered from the operation. A further objection resides in the undesired alteration in the configuration of the internal surfaces and dimensions of the reactor which the presence of the deposited mass induces. In processes of the type mentioned, and especially in the vapor phase oxidation of $TiCl_4$ to obtain pigmentary $TiO_2$, equipment design is frequently a critical factor and even minor dimensional changes cannot be tolerated. Furthermore, if reaction product build-up proceeds for too long a period, the vessel will be completely blocked off or plugged and shut-down for dismantling and clean-out is then necessary. A still further disadvantage is the inhibiting effect on heat transfer which the presence of the deposited solid exerts. It is often necessary to add to or remove from the reaction mixture substantial quantities of heat, which is conveniently accomplished by means of heat transfer through the reactor walls. Obviously, the presence of a deposited solid, nonconductive reaction product upon such walls is often sufficient to retard heat flow to a considerable, undesired extent.

A wide variety of proposals for removing deposits of this type has been suggested, including mechanical scraping. Unless the equipment is shut down during the scraping operation, the presence of corrosive substances at elevated temperatures renders the choice of suitable materials of construction, or design of operable stuffing boxes, extremely difficult. Furthermore, the scraping must be effected at extremely frequent intervals, or the deposit will become so hard and adhere so tightly to the reactor surfaces that the scraper will either fail to dislodge it, or damage the reactor surface in doing so. Contamination of product with fragments of build-up material is an attendant disadvantage. Chemical removal can be resorted to, but this ordinarily requires expensive shut-downs with considerable loss of time being incurred in the process. Careful design of equipment to minimize to some extent the opportunity for forming objectionable deposits can be resorted to, but in most cases equipment design is so rigidly prescribed by the demands of the process itself that variation therein for the purpose of preventing such build-up results in objectionable loss of yield, reduction in product quality, and increased costs. It has been proposed to introduce the halide through a shielding gas envelope, so that the reactants do not mix until they are in the central portion of the reaction vessel. While it is theoretically possible to eliminate wall build-up by arranging jets which will sweep all the surface of the vessel with a stream of gas, for example air or chlorine, this procedure has the disadvantage of requiring enormous quantities of shielding gases. Unfortunately, in obtaining products in desirable form it is essential that reactants be mixed rapidly in a confined space and diluted as little as possible, requirements which are diametrically opposed to the needs of a gas shielding type of operation. Formation of tightly-adhering deposits of coarsely crystalline material may be prevented for a relatively short period by maintaining the reactor walls at temperatures below those at which the reaction takes place. This procedure, however, does not prevent formation of an insulating layer of oxide product or pigment, so that objectionable coarse material rapidly forms.

From the foregoing, it is evident that, for economy of operation and production of oxide materials of optimum characteristics, a real need exists for a useful, workable method for preventing or minimizing the formation and deposition of tightly-adhering metal oxide reaction product upon the surfaces of a reactor employed in the vapor phase oxidation of a metal halide in which such oxide is produced.

It is, accordingly, among the principal objects of this invention to overcome the disadvantages which attend prior methods for the vapor phase oxidation of metal halides and to provide a novel and effective method for accomplishing such objects. It is among the particular objects of the invention to provide a novel process for producing valuable forms of pigment-useful metal oxides without attendant formation of objectionable adhering oxide deposits on the surfaces of the apparatus employed in such production, and to provide a method adapted to be operated continuously, over long periods of time, and which in no way limits the choice of conditions which are favorable to production of maximum yields of optimum quality products. A further, special object is to provide a relatively simple and effective method for continuously manufacturing pigmentary titanium dioxide through the vapor phase oxidation at elevated temperatures of titanium tetrachloride while avoiding formation of objectionable oxidic scale formation and deposition on the walls of the reactor and resulting apparatus plugging, characterizing prior $TiCl_4$ oxidation processes. Other objects and advantages of the invention will be apparent from the ensuing description and accompanying illustrative diagrammatic drawing showing a vertical, sectional view of one useful form of apparatus suitable for adapting the invention to practical application.

These and other objects are attained in this invention which comprises vapor phase reacting at temperatures ranging from about 800–1450° C. a metal halide with an oxidizing gas within a confined reaction zone comprising a substantially solid, porous refractory material, and during said reaction diffusing a gaseous halogen containing medium into said zone through said material sufficient in amount to provide a protective gas film over and shield the internal surfaces of said zone from substantial contact with said reactants, said porous refractory being a material capable of reducing the oxide and oxyhalide compounds of the metallic component of said metal halide reactant.

In a more specific embodiment, the invention comprises reacting, preferably at temperatures ranging from about 1000° to 1350° C., vaporized titanium tetrachloride with a humidified oxygen-containing gas, effecting said reaction within a restricted, tubular conduit comprising a solid, porous carbon refractory selected from the group comprising amorphous carbon, graphite, and mixtures thereof, and throughout said reaction maintaining a layer of chlorine-containing gas within and over the internal surfaces of said zone by diffusing said gas slowly and continuously through said porous carbon refractory and from an external source of supply maintained about said zone, whereby said surfaces become shielded from and are maintained out of contact with said reactants.

Referring to the accompanying drawing, there is shown a vertically-arranged furnace 1 which can be wholly or partly insulated and provided with a heating chamber 2 adapted to be heated in accordance with conventional, desired means. Suitably disposed within the heating chamber 2 is a tubular type reactor element 3, composed of corrosion-resistant metal or other suitable and desired material, having an inlet 4 and an outlet 5 through which outlet reaction products are withdrawn for recovery. Substantially intermediate the length of said tubular element, a reaction zone 6 is provided, the defining side walls 7 of which form as shown, a continuation of walls 8 and 9 of the tubular element 3. The reaction zone walls 7 comprise a porous, refractory material such as porous amorphous carbon, or graphite or other suitable solid substance capable of reducing the oxide of the metal halide reactant and adapted to enable halogen-containing gas such as chlorine, bromine or iodine to readily diffuse therethrough and for a purpose and in a manner to be presently referred to. Suitably disposed above the porous, carbon or graphite tubular reaction zone 6 and in concentric, spaced relationship about tubular element 3, is a second tubular element 10, also constructed of corrosion-resistant metal or other material adapted to withstand relatively high temperatures and the corrosive action of gaseous material subjected to reaction within the apparatus. The element 10 is provided with an inlet 11 which communicates with a passage 12 and terminates as an annular discharge or slotted circumferential jet outlet 13. Said outlet 13, passage 12 and inlet 11 are maintained in open communication with the interior of conduit 3 as well as with the reaction zone 6. Concentrically arranged in spaced, substantially enveloping, and in gas-tight relationship about the cylindrical, porous carbon, or graphite walls 7 of the reaction zone 6, is a cylindrical element 14, also made up of corrosion-resistant metal or like material, which forms a passage 15 and is provided with an inlet 16 through which gaseous medium from a source of supply (not shown) can be constantly maintained at any desired pressure about the said porous walls 7 and reaction zone 6.

The operation of an apparatus of the type described will now be detailed, with particular reference to one preferred adaptation of the invention in which production of titanium dioxide is effected in accordance with, for example, the methods disclosed in U.S. Patent No. 2,488,-439, dated November 15, 1945, to Holger H. Schaumann. In that patent rutile or anatase pigmentary $TiO_2$ is obtained by decomposing in the vapor phase a titanium halide, such as titanium tetrachloride, with an oxidizing gas such as oxygen, air, oxygen-enriched air, or mixtures thereof with various inert gases, and in the presence of regulated, small amounts of water vapor. In such decomposition, temperatures ranging above 800° C., and particularly in excess of 1000° C., and up to, say, 1350° C. or 1450° C., or higher, are resorted to. In applying such method to this invention, the oxidizing gas, suitably humidified with from, say, about 0.05% to 10%, and preferably from 0.1% to 5% (based on the total volume of gases) of water vapor, is charged separately and continuously into the reactor in the furnace 1 and through tubular conduit 3, via inlet 4 thereof, to ultimately pass and discharge into the porous graphite walled reaction zone 6. During such passage, heating of the oxidizing gas to any desired preheat or reaction temperature is effected, and immediately prior to its injection into the reaction zone 6 it becomes rapidly mixed with vaporized, anhydrous titanium tetrachloride being concurrently fed, continuously and separately, to such reactor and from a source of supply (not shown) via inlet 11, passage 12, and the circumferential slot jet means 13, so that it charges into the oxidizing gas, passing through conduit 10, in the form of a relatively thin sheet or stream and preferably in a direction at right angles to and across the axis of flow of such gas. The mixed reactants immediately pass into the reaction zone, wherein complete reaction at the temperatures mentioned is effected with the $TiCl_4$ being oxidized to $TiO_2$ and chlorine. The resulting reaction products containing the $TiO_2$ in suspension are then withdrawn from the reactor via its outlet 5, quickly cooled or quenched to temperatures below 600° C., in order to prevent undesired $TiO_2$ particle growth, as contemplated in said Patent 2,488,439, and the pigmentary $TiO_2$ is recovered.

Simultaneously with and throughout the introduction, passage and reaction of the oxidizing gas and titanium tetrachloride reactants within the reactor, chlorine gas is, in accordance with the invention, constantly introduced into and maintained within the confining space or passage 15 of the larger-diameter cylindrical jacket member 14 which is sealed about and exteriorly surrounds the porous graphite wall 7 of the tubular reactor 6. Preferably, the chlorine gas is maintained within said passage under an elevated pressure at least slightly in excess of that prevailing within the reaction zone 6 and adequate to force or cause the gas to slowly and steadily flow or diffuse through the pores of said wall into the interior of the reaction zone. As a result, a protective film or layer of an insulating or shielding gas is formed over and upon the internal surfaces of said zone and effectively prevents or minimizes contact of said reactants or their resulting reaction products with the internal surfaces of the reactor and avoids objectionable oxide scale formation and deposition or build-up thereon.

To a clearer understanding of the invention, the following specific examples are given, which are merely illustrative or specific applications of the invention and are not to be construed as in limitation of its underlying scope and effect:

*Example I*

In this example, a reactor of the general structure shown in the accompanying drawing was employed, in which the porous, tubular reaction zone assembly comprised a porous graphite tube 3″ in length, having a 1¼″ internal diameter and 1¾″ outer diameter, with an average pore radius of 48 microns. This tubular element was enclosed in a fused silica jacket of the same length having an internal diameter of 3⅜″. The circumferential jet or slotted inlet was enclosed within the furnace which was maintained at 1020° C., but outer portion of the porous tube assembly was exposed to the atmosphere for heat control. Dry chlorine at 20° C. was passed into the jacket space and forced through the walls of the porous graphite tube into the reaction zone at the rate of 0.26 pound moles per hour. The reactants were separately introduced into the reactor through silica coils in preheating chamber also maintained at 1020° C., and at the following rates:

| | Pound moles per hour |
|---|---|
| $TiCl_4$ | 0.193 |
| Oxygen, containing moisture equivalent to 2.4% by weight | 0.232 |

After 60 minutes of operation the tube was inspected and it was found that the porous graphite wall surface and the wall surface downstream thereof were completely free of attached scaliferous oxide deposit. An excellent quality $TiO_2$ pigment was obtained with complete reaction, such product exhibiting satisfactory hiding power, tinting strength, particle size uniformity, gloss and fineness.

*Example II*

In an apparatus of the general construction shown in the drawing but containing a porous carbon reaction zone tube 2" I.D. x 6" long, having an average pore radius of 33 microns, fitted with a fused silica jacket having an internal diameter of 3½", 0.38 pound moles per hour of chlorine were passed into the jacket passage and through the walls of the porous tube, at a temperature of about 20° C. Oxygen and $TiCl_4$ reactants were separately introduced to the reactor, being added via a preheating chamber and jet maintained at 1005° C. and the same titanium tetrachloride reactant rates as in Example I were utilized. After 14 hours, the run was discontinued to inspect the condition of the interior of the porous carbon tube. No observable scaliferous attached oxide deposit was found to exist on its internal walls, although there was a light film of pigment dust easily brushed off, and in no way hindering the operation of the reactor.

In a comparable operation to the above examples, but in which a non-porous silica tube reactor was used as a control instead of a porous carbon type tube in conjunction with a chlorine gas, and both the jet and reactor placed in a furnace at 1000° F., it was found that after only 10 minutes of operation all parts of the internal walls of the reactor were covered with coarsely crystalline titanium oxide scale tightly attached to the silica wall surface and which completely stopped the flow of reactant gases through the reactor.

*Example III*

Employing a reactor having the general construction shown in the drawing and provided with a porous carbon reaction zone tube having dimensions of 12" internal diameter and 24" length, with an average pore radius of 48 microns, titanium tetrachloride heated to 850° C. was supplied at a rate of 41,000 pounds per hour, where it was oxidized in the reaction zone upon admixture with a stream of oxygen. The oxygen reactant prior to addition was heated to 1150° C. and was added to the reactor in the form of a stream, using 20% excess of this reagent at a rate of 8300 pounds per hour. The oxygen contained water equal to 7.5 pounds $H_2O$ per 100 pounds of the oxygen reagent. Chlorine at room temperature was supplied to the exterior walls of the porous carbon reactor tube at a rate of 3060 pounds, the equivalent of 3.38 pounds of chlorine per square foot of wall area. The oxidation reaction proceeded over an extended period of time without substantial deterioration of the carbonaceous reaction zone wall and without build-up of oxide scale occurring on the interior surfaces of the tube and resulted in recovery of a high grade pigmentary $TiO_2$ product.

*Example IV*

Employing an apparatus of similar construction to those employed in the previous examples but which had a 10" internal diameter porous carbon reactor tube 30" long with the average pore size of such tube being 48 microns, 2630 pounds of chlorine per hour at 20° C. was passed through the walls of the tubular reactor to provide a purge density of 2.82 pounds chlorine per square inch of reactor wall area. Titanium tetrachloride preheated to 795° C. was added to the reaction zone at a rate of 14,250 pounds for admixture and reaction with 2880 pounds per hour of oxygen humidified with 240 pounds of $H_2O$ preheated to 1170° C. Oxidation operation was carried out for a period of 225 hours at the end of which period the porous reactor wall was found to be essentially clean and free of hard scale with only a light coating of $TiO_2$ dust which was readily removed therefrom by purging. 2.47 pounds of chlorine was added through the porous wall of the reactor per pound of chlorine produced by the oxidation reaction.

Although the invention is described in the above examples as applied to certain specific embodiments wherein particular reactants, temperatures, retention times, ratios, velocities, apparatus, etc., have been employed, it obviously is not limited thereto. It will be understood, therefore, that variance therefrom can be resorted to without departing from its underlying principles and scope. Thus, while the invention is outstandingly useful for converting $TiCl_4$, through oxidation, to $TiO_2$ to obtain a high-quality pigment therefrom, it is also utilizable in the oxidation of other titanium halides or mixtures, and especially the chlorides, bromides or iodides of that metal, as well as those of such additional metals as zirconium, aluminum, antimony, tin, zinc, etc., which react in the vapor phase with an oxygen-containing gas of the type herein contemplated to produce a solid, preferably white, metal oxide.

Again, while air or oxygen suitably enriched with $H_2O$ in the amounts mentioned, comprise preferred, useful forms of oxidizing gas, if desired, other types and amounts of oxidizing gases or mixtures thereof, in either dry or humidified state, and such as those already mentioned, can be employed.

Normally, the oxidation reaction is conducted at atmospheric pressure, but, if desired, it may be effected at super or subatmospheric pressures, and the differential in halogen containing gas pressure can be correspondingly varied. Similarly, any type or size of reactor conforming to the intended scale of operation can be used in applying the invention and while resort to a continuous operation is preferred, a discontinuous or batch type of procedure can also be adopted, if desired. The time of retention of reactants and resulting oxide product within the reaction zone is quite critical and important where pigmentary $TiO_2$ is being produced. In such instance, reactant retention times ranging from about .01 to 5 seconds are generally resorted to, with a preferred time ranging from .1 to 1 second. With such retention times, undesired particle size growth due to sintering of aggregates is avoided, which, if allowed to take place, would deleteriously affect ultimate $TiO_2$ pigment properties, especially tinting strength.

In the accompanying drawing, the reaction vessel comprises a cylindrical porous carbon tube, sealed into a gas-tight jacketing cylinder of larger diameter having an inlet for the introduction of the halogen containing gas into the space surrounding the porous walled reactor. The gas pressure within this space is maintained slightly higher than that in the reaction zone itself, so that the gas will flow slowly and steadily from the jacket through the walls of the porous carbon tube and into the reaction zone to provide a protective gas film on the wall surfaces of the reaction zone exposed to the reactants and products. The gaseous reactants, at elevated temperatures, are introduced into the reactor in the usual way, through a circumferential jet system designed to accomplish rapid mixing. In order to maintain the surface of the porous carbon or graphite reactor walls at temperature favoring the halogenation and removal of any titanium oxide particles which may penetrate the film of halogen gas or tend to occlude on said walls, the surface temperature of the porous wall is suitably maintained within the range of about 500–800° C., as by adjusting heat of reaction losses from the reactor. If desired, the halogen gas can be heated to about 300 to 600° C. prior to passage through the porous wall. In such halogenation, the TiO₂ first reacts with carbon present in the porous wall resulting in a volatile subchloride reduction product such as titanium oxychloride being formed. This subchloride then reacts with the chlorine present to form TiCl₄ which becomes oxidized in the system to the desired TiO₂ product.

For the sake of simplicity, a single gas inlet into the jacketing space is shown in the drawing. In some applications this may not afford complete and adequate distribution of the halogen containing protective gas. The effectiveness of the shielding film will be found to depend on its continuity over the entire reaction zone confirming surface to be protected, and it will frequently be found advantageous to resort to a manifold for effectively apportioning the gas thereover, so that protection of all parts of the surface will be assured, even with a minimum quantity of shielding gas.

Also, though in the accompanying drawing the invention has been applied only to the protection of the reaction vessel or zone itself, obviously the principle may be extended to the protection of the inlet jet as well, or any other reactor surfaces on which objectionable oxide deposits may occur. It is particularly convenient to extend the porous tube up into the circumferential jet so that it terminates to form one side of the slot jet inlet through which the titanium tetrachloride is admitted. If build-up should be encountered on the upstream face of the circumferential jet, a double wall spaced to provide a passage or channel for the introduction of additional shielding gas at said jet can be employed. Other possible variations in the apparatus illustrated will suggest themselves to those skilled in the art.

As already indicated, different types of porous carbon refractory materials are suitably useful in the invention. The choice for a particular application will depend upon such conditions as temperature, type of reactants, exposure to corrosive chemicals, and mechanical strength required. The size range, uniformity of size and distribution of pores in the refractory material, and size of the minute partitions between the pores, will obviously affect the distribution of the shielding gas and consequently the ease with which a protective film is maintained within the reactor.

The amount of halogen gas to be used must be determined separately for each particular application, since this will depend on the shape and size of the reaction vessel, velocity, temperatures, composition of the reacting gases, and nature and temperature of the shielding gas, uniformity and degree of porosity of the porous wall, the degree of protection from deposit required, and many other factors. In the production of titanium dioxide from titanium tetrachloride, the amount of chlorine gas can be related to the production of titanium dioxide by comparison with the amount of by-product chlorine produced by the main stream reaction $$TiCl_4 + O_2 \rightarrow TiO_2 + 2Cl_2$$

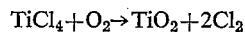

Thus, for reactors with reactant mixing efficiency and operative conditions equivalent to those described in the examples, the weight ratio of chlorine passed through the carbon reactor wall to by-product chlorine produced by the oxidation reaction is maintained within a range of .1 to 1, and preferably within a range of about .2 to .5. For example, using the conditions and the reactor described in Example II, the ratio of the pounds of chlorine passed through the porous carbon per hour per square inch of porous reactor wall surface to the pounds of chlorine produced by the above reaction per hour per square inch of reactor wall surface was approximately 1.0.

In the production of titanium dioxide by the above reaction, the most suitable gas for forming a protective film which is also capable of preventing attached titanium dioxide scale growth over the surface of the porous carbon refractory reaction chamber is chlorine. If desired, the chlorine may be mixed with an inert gas such as nitrogen, helium, argon, neon, and the like, or with non-oxidizing gas such as carbon monoxide, carbon tetrachloride and the like, generally, a porous carbon material with a pore size of .05 to 200 microns, although a preferred range is from about 10 to 130 microns. Variations in effective rate of gas diffusion also can be made by varying the thickness of the porous wall, and by making the porosity or porous wall thickness within a given reactor, variant. Thus, to obtain a higher ratio of gas throughput close to the circumferential slot, the porous carbon wall can be made one-half as thick for about a third of its length, and full thickness for the remaining portion downstream. The reaction chamber surface of the conduit type reactor employed by the process of the invention which usually is subject to build-up of scaliferous deposits and which can be protected by means of a porous carbon material capable of reacting with the titanium oxygen or titanium chlorine compounds is that portion of the conduit wherein the reactants become commingled and reacted. In the production of titanium dioxide in a process wherein extremely rapid mixing of reactants is obtained, as for example slotted circumferential jet of the figure, the effective length of the porous areas is about one to five times the diameter of the reaction chamber positioned downstream from the point of mixing of the reactants.

It will be apparent that the invention can be readily adapted to fit the particular needs of any variation of the oxidation processes for the production of metal oxides. By its practice, prior expensive and difficult batch types of operation can be readily converted to an economical, continuous type of process and without loss of yield through attached scale formation or the experiencing of shut-downs through apparatus plugging. Moreover, the practice of this invention does not appreciably affect the reaction itself; so that its full potentialities for the economical production of new and valuable forms of metal oxides are realized.

We claim:

1. A method for producing a titanium dioxide pigment which comprises decomposing within a reaction zone in the vapor phase and at temperatures ranging from about 800–1450° C., a titanium halide with an oxidizing gas, throughout the decomposition maintaining a film of a chlorine-containing gas over the internal surfaces of said zone adapted to prevent substantial contact of the reactants and reaction products with said surfaces, maintaining said film thereover by slowly and continuously diffusing said chlorine-containing gas into said zone from an external source and through a porous refractory wall the surfaces of which are maintained at from 500–800° C., said wall being selected from the group consisting of amorphous carbon, graphite, and mixtures thereof, having a pore size of from .05 to 200 microns and being capable of reducing in the presence of chlorine titanium oxide scale coming in contact therewith to a lower valent titanium compound for reaction with said chlorine-containing gas to form titanium tetrachloride, maintaining the weight ratio of chlorine gas passed through said porous wall to by-product halogen produced in the oxidation reaction within a range of .1 to 1, and recovering from the reaction zone the titanium dioxide pigment which forms therein.

2. A method for producing a titanium dioxide pigment which comprises decomposing within a reaction zone in the vapor phase and at temperatures ranging from about 800–

1450° C., titanium tetrachloride with an oxidizing gas, throughout the decomposition maintaining a film of a chlorine-containing gas over the internal surfaces of said zone adapted to prevent substantial contact of the reactants and reaction products with said surfaces, maintaining said film thereover by slowly and continuously diffusing said chlorine-containing gas into said zone from an external source and through a porous refractory wall the surfaces of which are maintained at from 500–800° C., said wall being selected from the group consisting of amorphous carbon, graphite, and mixtures thereof, having a pore size of from .05 to 200 microns and being capable of reducing in the presence of chlorine titanium oxide scale coming in contact therewith to a lower valent titanium compound for reaction with chlorine-containing gas to form titanium tetrachloride, maintaining the weight ratio of chlorine gas passed through said porous wall to by-product halogen produced in the oxidation reaction within a range of .1 to 1, and recovering from the reaction zone the titanium dioxide pigment which forms therein.

3. A method for producing a titanium dioxide pigment which comprises decomposing within a reaction zone in the vapor phase and at temperatures ranging from about 800–1450° C., titanium tetrachloride with a humidified oxidizing gas, throughout the decomposition maintaining a film of a chlorine-containing gas over the internal surfaces of said zone adapted to prevent substantial contact of the reactants and reaction products with said surfaces, maintaining said films thereover by slowly and continuously diffusing said chlorine-containing gas into said zone from an external source and through a porous refractory wall the surfaces of which are maintained at from 500–800° C., said wall being selected from the group consisting of amorphous carbon, graphite, and mixtures thereof, having a pore size of from .05 to 200 microns and being capable of reducing in the presence of chlorine titanium oxide scale coming in contact therewith to a lower valent titanium compound for reaction with said chlorine-containing gas to form titanium tetrachloride, maintaining the weight ratio of chlorine gas passed through said porous wall to by-product halogen produced in the oxidation reaction within a range of .1 to 1, and recovering from the reaction zone the titanium dioxide pigment which forms therein.

4. A process for producing pigmentary titanium dioxide which comprises decomposing within a reaction zone in the vapor phase and at a temperature in excess of 1000° C. and up to 1450° C., titanium tetrachloride with a humidified oxygen-containing gas, throughout the decomposition maintaining a film of a chlorine-containing gas over the internal surfaces of said zone to prevent substantial contact of the reactants and reaction products with said surfaces, maintaining said film thereover by slowly and continuously diffusing said chlorine-containing gas into said zone from an external source and through a porous carbon refractory wall the surfaces of which are maintained at from 500–800° C., said wall being capable of reducing in the presence of chlorine titanium dioxide scale coming in contact therewith to a lower valent titanium compound for reaction with said chlorine-containing gas to form titanium tetrachloride, effecting said vapor phase reaction within said zone over a reactant retention period therein of from 0.1 to 5 seconds, maintaining the weight ratio of chlorine gas passed through said porous wall to by-product chloride produced in the oxidation reaction within a range of .1 to 1, and recovering from the reaction zone the titanium dioxide pigment which forms therein.

5. A process for producing pigmentary titanium dioxide which comprises decomposing within a reaction zone in the vapor phase and at temperatures ranging from 1000° C. to 1350° C., titanium tetrachloride with air containing from .1% to 5%, based on the total volume of gases, of water vapor, throughout the decomposition maintaining a film of chlorine gas over the internal surfaces of said zone to prevent substantial contact of the reactants and reaction products with said surfaces, maintaining said film thereover by slowly and continuously diffusing said chlorine gas into said zone from a source maintained exteriorly about said zone under a pressure in excess of that prevailing in the reaction zone and through a porous carbon refractory wall the the surfaces of which are maintained at from 500–800° C., said wall having a pore size ranging from about 10–130 microns and being capable of reducing in the presence of chlorine titanium dioxide scale coming in contact therewith to a lower valent titanium compound for reaction with said chlorine gas to form titanium tetrachloride, retaining the reactants within said zone for a time period ranging from .01 to 5 seconds and the weight ratio of chlorine gas passed through said wall to by-product chloride produced in the reaction within a range of .1 to 1, and recovering from the reaction zone the titanium dioxide pigment which forms therein.

References Cited in the file of this patent

UNITED STATES PATENTS

| | | |
|---|---|---|
| 2,670,272 | Nutting | Feb. 23, 1954 |
| 2,670,275 | Olson et al. | Feb. 23, 1954 |
| 2,750,260 | Nelson et al. | June 12, 1956 |